United States Patent [19]

Woodhall et al.

[11] Patent Number: 5,750,190

[45] Date of Patent: *May 12, 1998

[54] PROTECTIVE COATING AND METHOD OF USING SUCH COATING

[76] Inventors: Edward W. Woodhall, 10450 W. Loyola Dr., Los Altos, Calif. 94022; Nicholas Kondrats, 5702 Cathedral Oaks Rd., Goleta, Calif. 93117

[*] Notice: The term of this patent shall not extend beyond the expiration date of Pat. No. 5,186,978.

[21] Appl. No.: 432,024

[22] Filed: May 1, 1995

Related U.S. Application Data

[60] Continuation-in-part of Ser. No. 209,796, Mar. 10, 1994, Pat. No. 5,411,760, which is a division of Ser. No. 16,872, Feb. 11, 1993, Pat. No. 5,362,786, which is a continuation of Ser. No. 972,037, Nov. 5, 1992, Pat. No. 5,302,413, which is a continuation-in-part of Ser. No. 788,006, Nov. 5, 1991, Pat. No. 5,186,978, which is a continuation-in-part of Ser. No. 614,330, Nov. 16, 1990, abandoned.

[51] Int. Cl.$^6$ .................... B65B 33/00; C08K 5/54
[52] U.S. Cl. .................... 427/156; 427/154; 427/257; 427/261; 427/282; 427/217; 427/387; 427/385.5; 427/421; 542/261; 542/267; 542/379; 542/389
[58] Field of Search .................... 524/267, 261, 524/379, 389; 427/156, 154, 257, 261, 282, 287, 385.5, 421

[56] References Cited

U.S. PATENT DOCUMENTS

| | | | |
|---|---|---|---|
| 2,020,256 | 11/1935 | Copeman | 427/421 |
| 2,082,791 | 6/1937 | Copeman | 118/505 |
| 2,275,578 | 3/1942 | Wood . | |
| 2,372,982 | 4/1945 | Richards et al. | 427/154 |
| 2,420,720 | 5/1947 | Pechukas et al. | 427/154 |
| 2,603,574 | 7/1952 | Holmes | 427/154 |
| 3,114,656 | 12/1963 | Oppenheim et al. | 427/154 |
| 3,146,883 | 9/1964 | Harlan et al. . | |
| 3,201,274 | 8/1965 | Hobbs, Jr. | 427/156 |
| 3,202,554 | 8/1965 | Hornus | 148/22 |
| 3,218,183 | 11/1965 | Fritzsching et al. . | |
| 3,423,225 | 1/1969 | Coney et al. | 427/154 |
| 3,445,275 | 5/1969 | Bogart . | |
| 3,492,258 | 1/1970 | Kremer | 260/27 |
| 3,620,796 | 11/1971 | Gordy | 427/154 |
| 3,625,727 | 12/1971 | Lightfoot et al. . | |
| 3,696,498 | 10/1972 | Leontaritis et al. | 29/424 |
| 3,712,829 | 1/1973 | Steigelman . | |
| 4,053,666 | 10/1977 | Taylor et al. | 428/35 |
| 4,055,441 | 10/1977 | Taylor et al. | 134/10 |
| 4,145,855 | 3/1979 | Sheldon | 52/232 |
| 4,169,088 | 9/1979 | Hansen | 39/4 |
| 4,199,620 | 4/1980 | Edwards et al. | 427/156 |
| 4,200,671 | 4/1980 | Krajewski et al. | 427/154 |
| 4,222,922 | 9/1980 | Rees . | |
| 4,287,103 | 9/1981 | Francis et al. | 260/17 R |
| 4,428,857 | 1/1984 | Taylor et al. | 252/193 |
| 4,456,731 | 6/1984 | Caporossi et al. | 525/61 |
| 4,582,761 | 4/1986 | Liu | 524/379 |
| 4,592,756 | 6/1986 | Kawasaki et al. | 8/527 |
| 4,612,058 | 9/1986 | Geke et al. | 134/38 |
| 4,634,607 | 1/1987 | Ernsberger | 427/282 |
| 4,748,049 | 5/1988 | Charles et al. | 427/156 |
| 4,759,959 | 7/1988 | Guy | 427/282 |
| 4,792,464 | 12/1988 | Martenson | 427/156 |

(List continued on next page.)

FOREIGN PATENT DOCUMENTS

| | | |
|---|---|---|
| 454888 | 3/1949 | Canada . |
| 58-80301 | 5/1983 | Japan . |
| 185634 | 10/1963 | Sweden . |
| 2191717 | 12/1987 | United Kingdom . |

OTHER PUBLICATIONS

"Masker–Aide Technical Bulletin", Mar., 1993.

"Masker–Aide" Material Safety Data Sheet, Mar. 17, 1993.

"Partall ®Mold Release Agents Film #10 Paste #2" Product Bulletin (no date).

"Magic Mask" Analysis (no date).

"Slime" product label and formulation data (no date).

"Partall Film #10" Material Safety Data Sheet (no date).

"Clean Strip" report (no date).

"Fluorad" Technical Brochure (no date).

"Zonyl" Technical Brochure (no date).

"Parting Film No. 10" product information, Costa Chemical Corp. (dates unknown): (1) product description; (2) Material Safety Data Sheet.

"Masker–Aide" product information, Solution Techniques, Inc., Jun. 1989: (1) Cal–West Automotive Inc. fax cover sheet, Sep. 21, 1990; (2) Assoc. Members Given Preview of Overspray Protection Product, *Automotive Body Repair News*, p. 51; (3) price list.

"Kwikee Spray Mask" Material Data Safety Sheet, Nov. 7, 1990.

"Liquid Masking Paper" Material Safety Data Sheet, Rukin Industries, Inc., Oct. 25, 1990.

"Liquid Masking Paper," *Autophile*, Rukin Industries, Inc., Technical Bulletin #3, Dec. 1, 1991.

"Magic Mask" product information, Are the Extra Expenses of Your Overspray Masking System Killing You?, U.S. Chemical & Plastics, Inc., Morton Paint Company, Townsend, Inc., May 17, 1991 (alleged).

"Elvanol" Product nd Properties Guide, Mono–Sol Div. of Chris–Craft Corp. (date unknown).

"Profile of a Polymer," Gerhring–Montgomery, Inc., Sep. 1989.

*Primary Examiner*—Janyce Bell

[57] ABSTRACT

A vehicle masking material and method of use. The masking material in one embodiment includes polyvinyl alcohol, ethyl alcohol, a plasticizer, a surfactant composition including a functional derivative of a fluorinated alkyl chain, and water. The masking material is applied to a surface which is to be protected from paint overspray or other mechanical process, allowed to dry, and paint is applied. After drying of the paint, the masking material is removed by peeling or water washing.

25 Claims, No Drawings

U.S. PATENT DOCUMENTS

| | | | |
|---|---|---|---|
| 4,844,833 | 7/1989 | Komatsu et al. | 254/174.13 |
| 4,956,404 | 9/1990 | Pelzig | 524/563 X |
| 5,026,597 | 6/1991 | Franz et al. | 428/323 |
| 5,028,350 | 7/1991 | Marsek | 428/78 |
| 5,093,401 | 3/1992 | Claussen et al. | 524/388 X |
| 5,104,711 | 4/1992 | Marsek | 106/208 |
| 5,143,949 | 9/1992 | Grogan et al. | 524/388 X |
| 5,151,461 | 9/1992 | Perrington et al. | 524/389 X |
| 5,183,688 | 2/1993 | Sorko-Ram | 427/164 |
| 5,186,978 | 2/1993 | Woodhall | 427/154 |
| 5,201,946 | 4/1993 | Marsek . | |
| 5,302,413 | 4/1994 | Woodhall | 427/154 |
| 5,362,786 | 11/1994 | Woodhall et al. | 524/267 |
| 5,411,760 | 5/1995 | Woodhall et al. | 427/156 |
| 5,494,702 | 2/1996 | Blaine et al. | 427/154 |

PROTECTIVE COATING AND METHOD OF USING SUCH COATING

CROSS REFERENCE TO RELATED APPLICATIONS

This application is a continuation-in-part of Ser. No. 08/209,796, Mar. 10, 1994, U.S. Pat. No. 5,411,760, which is a divisional of Ser. No. 08/016,872, Feb. 11, 1993, U.S. Pat. No. 5,362,786, which is a continuation of Ser. No. 07/972,037, Nov. 5, 1992, U.S. Pat. No. 5,302,413, which is a continuation-in-part of Ser. No. 07/788,006, Nov. 5, 1991, U.S. Pat. No. 5,186,978, which is a continuation-in-part of Ser. No. 07/614,330, Nov. 16, 1990, now abandoned, which are all incorporated herein by reference for all purposes.

BACKGROUND OF THE INVENTION

The present invention relates to the field of protective coatings to be used during mechanical processing operations of vehicles or buildings. More specifically, in one embodiment the invention provides an improved method and composition for masking selected portions of a vehicle from paint.

It is well known that painting operations often require masking of certain portions of the vehicle or building to prevent overspray. For example, it is often necessary to mask trim and windows on a vehicle from paint overspray. Also, building stucco must frequently be protected from paint or primer coats. On occasion, it is necessary to mask painted portions of a vehicle or building from paints of a different color and overspray of paints of the same color. It is also well known that many surfaces are susceptible to marring and scratching during mechanical processing operations on proximate surfaces. For example, welding and grinding can have deleterious effects on surrounding surfaces.

In practice, masking operations are often one of the most time consuming and, therefore, expensive parts of the painting process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces which are desired to be protected.

Solutions have been proposed to the problem of protecting surfaces during mechanical processing operations. However, such techniques have often not found extensive use. Some of the proposed chemical masks have been unsuitable for application to portions of a vehicle or building because of damage which would potentially occur to the protected portions of the vehicle or building. Other compositions are not water soluble. This causes particular problems because environmental controls of solvents are becoming stricter with time. Other compositions are difficult to apply, difficult to remove, excessively costly, or the like.

From the above it is seen that an improved masking composition is needed.

SUMMARY OF THE INVENTION

An improved masking composition and method is provided by virtue of the present invention. The method includes the steps of applying a substantially continuous film of a masking material on a vehicle, building, or other work surface to be protected during a "mechanical processing operation". Such operations include, for example, painting, grinding, welding, and etching. These steps may be performed, for example, during an assembly line production of a vehicle. By "building" it is intended to mean herein a house, warehouse, apartment, garage, store, or the like. By "vehicle" it is intended to mean herein a car, boat, plane, train, railroad car, or the like. By "substantially continuous film" it is intended to mean herein a film lacking pinholes through which paint or other materials generated during mechanical processing could reach an underlying surface. The masking material is, in one specific embodiment, a composition of water, an aliphatic polyol, alcohol, and a surfactant composition. In a different embodiment the masking material includes water, a plasticizer (such as glycerine, triethylene glycol or polyethylene glycol), an aliphatic polyol, alcohol and surfactant. In preferred embodiments, the surfactant composition will include a functional derivative of a fluorinated alkyl chain ("fluorocarbon surfactant"). In more preferred embodiments, the surfactant will include a nonionic polyethoxylate in addition to the fluorocarbon surfactant. The masking material may additionally include a blocking agent, such as an oxyalkylene polymer (e.g. 20M), that reduces the water associated with the aliphatic polyol. To increase the ease of wash-off, the masking material may also include materials such as lecithin to reduce bubble formation.

The masking material will dry quickly, and be readily removable with water after use. Further, the material is relatively harmless from an environmental point of view.

A further understanding of the nature and advantages of the inventions herein may be realized by reference to the remaining portions of the specification.

DESCRIPTION OF THE PREFERRED EMBODIMENTS

The present invention provides an improved method and composition for protecting a vehicle or other work surface to be painted or mechanically processed. For example, certain regions of an automobile may be masked in accordance with the present invention to protect those regions from paint overspray in a painting booth. The method and composition produces a film which adheres well to a surface to be protected, with few or no pinholes. Further, the material can be removed easily from the surface to be protected after use with a water wash, or by peeling, or by combinations of the two.

More generally, the present invention provides an improved method and composition for protecting selected surfaces during selected mechanical processing operations such as welding or grinding, as well as painting. The adherent film of the present invention protects the selected surface from marring, scratching or other deleterious effects associated with mechanical processing. The mechanical processing steps might be encountered, for example, during assembly or repair of vehicles, or during construction or renovation of buildings. The present invention can be employed with particular advantage during fabrication of vehicles or other products on an assembly line. An assembly line production typically employs a series of steps including, for example, grinding, welding, and painting. Each of these operations can advantageously employ the masking composition and method of the present invention.

One embodiment includes water, an aliphatic polyol, alcohol, and a surfactant. According to preferred embodiments, the composition includes at least about 1% polyvinyl alcohol by weight. Preferred compositions include between 1 and 30% aliphatic polyol such as polyvinyl alcohol, with most preferred compositions of about 5 to 20% polyvinyl alcohol, and one specific embodiment including about 8% polyvinyl alcohol. The aliphatic polyol component may include two different polyols having different molecular weight ranges. For example, DuPont Corporation's Elvanol 5105 (15,000 to 27,000 daltons) and Elvanol 5042 (70,000 to 100,000 daltons) can be used together in some formulations.

For some applications, it will be necessary to provide a "thicker" or more viscous protecting material formulation. For instance, in painting train boxcars, a thicker formulation is desirable for protecting the wheels and couplings from overspray. The wheels and couplings of boxcars must be periodically inspected for cracks by techniques which are well known in the art. To avoid obscuring these cracks, the protecting material should be thick enough that it does not penetrate any existing cracks. For such applications, the protecting material formulation may be made thicker by a variety of means which are well known in the art. For example, the concentration of a high molecular weight polyvinyl alcohol can be increased. Preferably, the masking material will have a viscosity of about 50 to 1000 centipoise, and preferably about 200 centipoise.

It has been found that for general purposes, a superior masking material includes water, an aliphatic polyol (preferably a partially hydrolyzed polyvinyl alcohol having a molecular weight from about 15,000 to about 100,000), a plasticizer, alcohol, and a surfactant. According to preferred embodiments, the composition includes at least about 0.1% by weight of a plasticizer such as glycerine. Preferred compositions include between 0.5 and 7% glycerine, and one specific embodiment including about 1% glycerine.

An alternative preferred embodiment includes water, triethylene glycol, an aliphatic polyol, alcohol and surfactants. According to this embodiment, the composition includes as a plasticizer at least about 0.1% by weight triethylene glycol. More preferably, the triethylene glycol content ranges from 0.5% to 5%, and in one specific embodiment includes about 2% triethylene glycol. For some applications, a polyethylene glycol having a molecular weight of between about 100 and 1,000 may be substituted as a plasticizer for the triethylene glycol.

The masking material will include a lower molecular weight alcohol. Preferred alcohols for the composition include methyl alcohol, ethyl alcohol, and 2-propyl alcohol. A most preferred alcohol is ethyl alcohol. For many applications, the percentage of alcohol utilized is preferably less than about 25% by weight (based on 190-proof alcohol), with compositions having less than 20% alcohol most preferred. When ethyl alcohol is utilized, most preferred compositions include between 10 to 20% alcohol with about 10 to 15% preferred, and 12 to 13% most preferred. However, when thicker formulations are desired, a higher concentration of alcohol may be used to speed the drying process. Up to about 40% alcohol can be used for some applications. When methyl or propyl (such as isopropyl or 2-propyl) alcohol is utilized as a denaturant, compositions with less than 1.0% by weight denaturant alcohol are preferred, and compositions of between 0.5 and 1.0% are most preferred.

In other preferred embodiments, the masking material may additionally include a blocking agent that reduces the water associated with the aliphatic polyol and/or an agent that reduces bubble formation. A most preferred blocking agent is an oxyalkylene polymer such as polyethylene glycol (e.g. Union Carbide 20M), while a most preferred agent that reduces bubble formation is lecithin.

The masking material also includes a surfactant. The total surfactant in the material will often include two or more different surfactants. In preferred embodiments, the masking composition includes surfactants having fluorinated alkyl chains such as "Fluorad" products sold by Minnesota Mining and Manufacturing, St. Paul, Minn. and "Zonyl" products sold by DuPont Company, Wilmington, Del. In addition, many embodiments include polyethoxy adducts or modified (poly)ethoxylates such as Triton DF-12 and DF-16 sold by Union Carbide (Danbury, Conn.). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), alkyl aryl surfactants (such as Triton CF-10 and CF-12) and the like. Preferred compositions include up to 10% surfactant. Most preferred compositions include less than 5% by weight surfactant and more preferably less than 1% surfactant, with specific implementations ranging from about 0.1% to about 0.3%, more preferably about 0.2% to about 3% and most preferably including about 0.25% or about 0.3% surfactant.

A primary role of the surfactant in the masking composition is to ensure that the resulting film is level and free of pinholes and other discontinuities. A sufficiently level film could be obtained with little or no surfactant so long as the masking composition contains a very high solids content (e.g., high concentrations of polyvinyl alcohol). Unfortunately, films formed from compositions containing high levels of solids must be thick—up to 10 mils or more—which often results in unacceptably long drying times. To make a thinner (and thus faster drying film) some mechanism is necessary to ensure that a level, pinhole-free film is produced. Otherwise, overspray or other mechanical influences will impinge on the areas to be protected.

To provide a level film, the masking composition must adequately wet the surface to be protected. Unfortunately, car body finishes and many other surfaces are purposely made to have a low surface free energy so that water will bead. To prevent the masking composition from beading, the surface tension of the masking composition must be lowered. This can be accomplished by increasing the alcohol composition or by adding certain surfactant compositions. Higher alcohol concentrations make the composition more flammable and more deleterious to the protected surface. Thus, surfactants are preferably used with the masking compositions of the present invention.

Preferred surfactants for use in the masking compositions of the present invention should have certain beneficial properties. For example, they should reduce the surface tension of the composition to a sufficiently low value that a level film, free of pinholes, is laid down. In most instances the surfactant will reduce the surface tension of the masking composition to at most about 25 dynes per centimeter, and more preferably to at most about 20 dyne/cm. To avoid formation of pinholes, the surfactant should not foam. Further, the surfactant should work with a variety of surfaces such as those containing silicones, acrylic waxes, teflon® waxes, clear coats, natural and hydrocarbon waxes, etc. Still further, preferred surfactants will be relatively inexpensive, will provide a product that does not spot, streak, or frame (i.e., evaporate faster at edges such as molding and/or trim) on the surface to be protected. Finally, the surfactant should be water soluble and otherwise compatible with the other components of the masking composition so that the composition does not separate and leave pinholes when dry.

Because many surfaces to be protected will have unusually low surface free energies, the surfactant should be able to dramatically lower the surface and interfacial tensions of the masking composition. Compositions having very low surface tensions also tend to produce many fewer pinholes in the coating. Thus, any of the known classes of very low surface tension surfactants are preferred for use with this invention. One such class is the alkoxylates of fluorinated alkyl chains. Other functional derivatives (e.g., esters, sulfonates, carboxylates, ammonium compounds, etc.) of fluorinated alkyl chains also tend to produce low surface tension aqueous solutions. In general, replacement of hydrogens on an alkyl group by fluorine atoms leads to surfactants of unusually low surface tension. The above mentioned "Fluorads" and "Zonyls" are examples of surfactants having fluorinated alkyl chains.

As discussed below, it has been discovered that a particularly preferred embodiment includes a 3:2 ratio of Fluorad FC 171 (a fluorinated alkyl alkoxylate) to Fluorad FC 430 (a fluorinated alkyl ester). However, any combination of compatible surfactants that produce sufficient leveling on a given surface can be used. Particularly preferred compositions will provide a level film on a variety of different surfaces and will not spot, streak or frame when the film is rewetted.

In some embodiments, a "bulk" surfactant from a different chemical class will be admixed with the fluorinated surfactants to promote low interfacial tension and good rewetting properties. Preferred bulk surfactants will allow the mask to be rinsed off easily without spotting or streaking the underlying protected surface. Preferred bulk surfactants will produce very little or no foam during application or rinsing. They should also be relatively inexpensive. Suitable bulk surfactants include various compounds such as polyethoxylates and, in one case, octylphenoxypolyethoxyethanol. A particularly preferred bulk surfactant for use with Fluorad FC 171 and Fluorad FC 430 is Triton DF-16 a nonionic polyethoxylate.

Under certain conditions removal of the mask from acrylic finishes may leave a pattern of temporary discoloration corresponding to variations in thickness of the mask. This discoloration vanishes upon drying of the of surface. Without being bound to a particular theory, it is believed that the discoloration is a result of hydration of the underlying finish by water present in the mask composition.

This discoloration may be prevented by the inclusion of an agent that prevents hydrogen bonding, or other association, of water with the aliphatic polyol of the mask. Such agents are referred to herein as "blocking" agents. Particularly preferred blocking agents include oxyalkylene polymers such as polyethylene oxide waxes, polypropylene oxide waxes, polyethylene oxide/polypropylene oxide copolymers, polyethylene glycols and their derivatives. Most preferred blocking agents include polyethylene glycols, such as Carbowax (e.g. Union Carbide 20M). Without being bound to a particular theory, it is believed that preferred blocking agents act by hydrogen bonding with the aliphatic polyol and thereby blocking reactive sites that could otherwise hydrogen bond with water. The blocking agent is preferably present at up to about 4%, more preferably between about 0.4% to about 3%, and most preferably between about 1% to 2%, by weight, of the mask composition. While in some embodiments, the blocking agent might exceed 4%, increased concentrations of blocking agent also increase the viscosity of the masking composition. Thus, where it is desired to use the mask in a spray-on application, it is desirable to maintain the blocking agent concentration below about 4%, by weight, of the total composition.

It is also desirable to prevent the formation of air bubbles in the mask composition. Air bubbles also trap moisture and can result in hydration of the underlying finish. The inclusion of lecithin prevents the formation of air bubbles and thereby prevents hydration of the underlying surface. Lecithin is preferably present between about 0.1% to about 2%, more preferably between about 0.25% to about 0.6% and most preferably about 0.5%, by weight, of the total composition. Air-bubble formation may also be reduced or prevented by the addition of defoamers as described below.

The mask also includes a substantial amount of water, such as deionized water having a resistivity of about 18 megohm-cm. In one embodiment of the invention, the balance of the mask is composed of water, although a variety of other materials may also be included such as dyes, odorants, and the like.

Antistatic compounds are added in preferred embodiments to reduce static build-up. This prevents static from being drawn to the vehicle in question. Antistatics (such as Larostat 264A made by Mazer Chemicals) are provided in some embodiments, and are preferably water soluble. Sequesterants are also added in some embodiments (less than 1%) such as citric acid for a pH of 5–6, glycolic, sodium citrate or the like. Sequesterants will reduce spotting.

The masking material is made by conventional means, typically including the steps of gently mixing the components of the masking material at substantially atmospheric pressure, so as to form a substantially homogeneous mixture. The components are preferably heated during mixing such as from 180° F. to 200° F., excluding the alcohols, which are added after mixing the remaining components.

The masking material is applied by one of a variety of techniques. Preferred techniques include brushing and spraying of the material. In one preferred embodiment the surface to be protected is blown dry of dust and debris. In some cases, additional water may be added for easier application, such as a 10% dilution. Thereafter, the masking material is applied with a pressure pot sprayer, preferably first in a thin mist and, thereafter, in a flow coat or thicker substantially continuous film. For some applications, the mist coat will not be necessary. The mask material is sprayed primarily on the surface to be protected, although overspray will not pose significant problems since any overspray may be readily removed with, for example, a wet towel or sponge. In preferred embodiments, the resulting masking coating is from about 0.5 to 4 mils thick, preferably about 1.5 to 2.5 mils thick, with a preferred thickness of about 2 mils.

The masking material is then permitted to dry, normally at atmospheric temperatures and pressures. Such drying will take about 10 to 30 minutes in typical applications (at room temperature and 30% humidity). Significantly longer drying times are needed at 50° F. For such lower temperatures, additional ethanol may be provided in a separate container to increase the ethanol content by about 10% by weight. The surface is then painted or otherwise mechanically processed without fear of overspray on the portions of the surface protected by the masking material. Baking (at, e.g., 130° F.) may be desirable in some embodiments.

If the processing operation includes painting, the paint is first allowed to thoroughly dry. Such drying times will vary radically depending upon the particular type of paint utilized. After drying of the paint, the masking material is removed from the protected surface. Such removal operations may include, for example, peeling of the material off of the protected surface. In alternative embodiments the mask is removed by normal washing with water, but pressure washing with water may be desired in some instances.

The material will be removed readily since it is easily miscible or soluble in water.

EXAMPLES

The following examples are offered as illustrations of the invention:

1. Alcohol Content

Four samples of masking material were made including 6 to 9% polyvinyl alcohol, about 0.3% surfactant, and water. Varying amounts and types of alcohols were utilized. Alcohols included ethanol, isopropanol, and methanol. Automotive surfaces were masked with the materials. The tests showed that while higher percentages of alcohol produced faster drying mask materials and better layout of the materials, automotive paints were adversely effected, resulting in dulling of the paint. Isopropyl and methyl alcohols were found to have the most deleterious impact on automotive paint. Ethyl alcohol contents of from 10 to 20% did not result in paint damage, while having suitable drying times (about 30 minutes, with the higher alcohol content samples having shorter drying times), and solids dispersion properties. Lower alcohol content may also be desirable to ensure a higher flash point material, preferably above 100° F.

Using methyl and propyl alcohol as denaturants, it was necessary to maintain the denaturant alcohol content below 1% of the total masking finished product to reduce paint damage to an acceptable level. Other water soluble denaturants known to those of skill in the art can be employed. It should be understood that denaturants are employed in the present invention so that the masking compositions can be packaged and marketed without special licenses and precautions. Masking formulations capable of producing high-quality protective coatings can be prepared without a denaturant.

2. Surfactant

In a first set of experiments, base samples with 8% polyvinyl alcohol and ethyl alcohol contents ranging from 10 to 25% were prepared. Multiple surfactants were tested including acetylenic diol-based surfactants (such as TG and PC made by Air Products), polyoxyalkylene glycol-based surfactant (Macol 18 and 19 made by Mazer Chemicals), nonylphenoxypolyethanol-based surfactant, and polysiloxane. 0.3% surfactant was utilized. Acetylenic diol-based compounds produced satisfactory results (i.e., no spotting or dulling). Polyoxyalkylene glycol-based materials produced the best results, but suffered from foaming during application. Glycol-based compounds laid out the best overall.

In order to reduce residual films left by the masking materials, additional surfactants were tested. Alkyl aryl-based surfactants (Triton CF-10 and CF-12 or Perform Plus), polyethoxy adduct-based surfactants, and modified ethoxylate-based surfactants (such as Triton DF-12 and DF-16) were tested for residual film prevention. Polyethoxy adduct-based surfactants and modified ethoxylate-based surfactants provided reduced film retention. Particularly good results were obtained using Fluorad 171 and Fluorad 430 (both made by Minnesota Mining and Manufacturing Company) in conjunction with Triton DF-16.

According to a preferred embodiment, the masking material included the following components presented in a per weight basis:

Deionized water (18 Megohm-cm) 79%

PVA, partially hydrolyzed solids, (typically 87%–89% hydrolyzed)

Ethyl alcohol 12.5% (190 proof including methanol and isopropanol)

Surfactant, Fabrilife Perform Plus, 0.3%

Antistatic, less than 0.5%

Defoamer, less than 1%

According to a different preferred embodiment, the masking material included the following components presented in a per weight basis:

Deionized water (18 megaohm) about 77.25%

Triethylene glycol 2.0%

Denatured ethyl alcohol 12.5%

Surfactant 0.25% (Triton DF-16/Fluorad mixture)

Polyvinyl alcohol (Elvanol 5042 (Dupont Corp.) 1.0% and Elvanol 5105 (Dupont Corp.) 7.0% )

According to a most preferred embodiment, the masking material included the following components:

Deionized Water (18 megaohm) about 78.75%

Glycerine 1.0%

Denatured Ethyl Alcohol 12.0%

Surfactant 0.25% (Triton DF-16/Fluorad mixture)

Polyvinyl Alcohol (Elvanol 5042 (Dupont Corp.) 1% and Elvanol 5105 (Dupont Corp.) 7%)

A masking material providing providing cleaner washoff and reduced temporary discoloration (hydration) of the underlying finish included the following components presented in a per weight basis:

Deionized Water (18 megaohm) 76.75%–77.75%

Glycerine 1.0%

Denatured Ethyl Alcohol 12.0%

Surfactant 0.25% (Triton DF-16 0.20%, 3M PC 171 0.03%, and 3M PC 430 0.02%))

Polyvinyl Alcohol (Elvanol 5042 (Dupont Corp.) 1% and Elvanol 5105 (Dupont Corp.) 7%)

Polyethylene Glycol 1%–2% (Carbowax 20M, Union Carbide)

In some embodiments this composition contained about 0.5% lecithin either in place of or in addition to the polyethylene glycol.

Another masking material providing providing cleaner washoff and reduced temporary discoloration (hydration) of the underlying finish included the following components presented in a per weight basis:

Deionized Water (18 megaohm) 84.75%–85.75%

Glycerine 2.0%

Surfactant 0.25% (Triton DF-16 0.20%, 3M PC 171 0.03%, and 3M PC 430 0.02%))

Polyvinyl Alcohol 11% (Elvanol 5105, Dupont Corp.)

Polyethylene Glycol 1%–2% (Carbowax 20M, Union Carbide)

In some embodiments this composition contained about 0.5% lecithin either in place of or in addition to the polyethylene glycol.

A thicker masking material included the following components presented in a per weight basis, especially for use in train masking operations and the like:

Deionized Water 49.71%

Denatured Ethyl Alcohol (190 proof) 35.00%

Glycerine 5.00%

Polyvinyl Alcohol (Elvanol 5042 (DuPont Corp.) 2.66% and Elvanol 5105 (DuPont Corp.) 7.33%)

Surfactant 0.25% (Triton DF-16 0.20%, 3M PC 171 0.03%, and 3M PC 430 0.02%)

Yellow Dye 0.05%

3. Scents

Samples were tested to determine if an odorant would be needed to overcome effects of the high alcohol content. It was found that scent did not appreciably improve the odor of the material when alcohol content was maintained below 20% and that the material had a pleasant smell.

4. Defoamers

Samples were tested with various defoamers. Samples were tested with polysiloxane (XFB41-58 made by Air Products), acetylenic glycol (Surfynol 64A made by Air Products), and oil-based defoamers in an amount of less than 1%, and preferably 0.05%. Polysiloxane and acetylenic glycol produced satisfactory masking material. Oil-based defoamers left an oily residue on protected surfaces. Acetylenic glycol defoamer was preferred.

It has been found that defoamers work best when the masking composition is applied very soon after the defoamer is added to the composition. If the mixture is allowed to stand for a length of time after the defoamer is added, pinholes may form on protective coating.

The above description is illustrative and not restrictive. Many variations of the invention will become apparent to those of skill in the art upon review of this disclosure. Merely by way of example, while the invention is illustrated with regard to particular brands of materials used in the mask, the invention is not so limited. The scope of the invention should, therefore, be determined not with reference to the above description, but instead should be determined with reference to the appended claims along with their full scope of equivalents.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference.

What is claimed is:

1. A method of temporarily protecting portions of a motor vehicle surface from paint, said method comprising the steps of:
    a) applying a masking material to said surface portions of said motor vehicle, wherein said applying is effective to produce a substantially continuous film of a masking material over said surface portions of said motor vehicle, said masking material comprising
        (i) between about 5% to about 25%, by weight, polyvinyl alcohol;
        (ii) less than about 20%, by weight, ethyl alcohol, based on 190 proof alcohol;
        (iii) a surfactant composition present in an amount effective to produce a coating that lays out smoothly in a substantially continuous thin film;
        (iv) less than about 4%, by weight, a blocking agent selected from the group consisting of polyethylene oxide, polypropylene oxide, polyethylene oxide/polyoropylene oxide copolymer, polyethylene glycol, and lecithin; and
        (v) water; with the proviso that components (ii) and (iii) are present;
    b) painting said surface of said motor vehicle, wherein said masking material is effective to prevent paint to cause contact with said surface portions of said motor vehicle to be protected; and
    c) removing said masking material from said surface portions of said motor vehicle to be protected by peeling or with a water wash, whereby paint applied to said protected portions of said surface of said motor vehicle is removed together with said masking material.

2. The method of claim 1, wherein said blocking agent is polyethylene glycol.

3. The method of claim 1, wherein said surfactant composition is present in an amount ranging from between about 0.1% to about 1%, by weight of the total composition.

4. The method of claim 1, wherein said surfactant composition includes a functional derivative of a fluorinated alkyl chain.

5. The method of claim 1, wherein said masking material further comprises between about 0.1% to about 2% lecithin.

6. The method of claim 1, wherein said masking material further comprises an alcohol selected from the group consisting of methanol, ethanol, propanol and isopropanol.

7. The method of claim 6, wherein said alcohol comprises methanol.

8. The method of claim 6, wherein said alcohol comprises ethanol.

9. The method of claim 6, wherein said alcohol comprises a denaturant in an amount less than about 1% by weight.

10. The method of claim 1, wherein said masking material further comprises at least about 1% of a plasticizer by weight.

11. The method of claim 10, wherein said plasticizer is selected from the group consisting of glycerine, polyethylene glycol, and triethylene glycol.

12. The method of claim 11, wherein said masking material comprises
    between about 5% to about 15%, by weight, polyvinyl alcohol;
    between about 5% to about 20%, by weight, ethyl alcohol;
    between about 0.4% to about 3%, by weight, polyethylene glycol; and
    about 1%, by weight, glycerine.

13. A method of temporarily protecting portions of a motor vehicle surface from paint, said method comprising the steps of:
    a) applying a masking material to said surface portions of said motor vehicle, wherein said applying is effective to produce a substantially continuous film of a masking material over said surface portions of said motor vehicle, said masking material comprising
        (i) between about 5% to about 25%, by weight, polyvinyl alcohol;
        (ii) a surfactant composition present in an amount effective to produce a coating that lays out smoothly in a substantially continuous thin film;
        (iii) less than about 4%, by weight, a blocking agent selected from the group consisting of polyethylene oxide polypropylene oxide, polyethylene oxide/polypropylene oxide copolymer, polyethylene glycol, and lecithin; and
        (iv) water; with the proviso that component (iii) is present;
    b) painting said surface of said motor vehicle, wherein said masking material is effective to prevent paint to cause contact with said surface portions of said motor vehicle to be protected; and
    c) removing said masking material from said surface portions of said motor vehicle to be protected by peeling or with a water wash, whereby paint applied to said protected portions of said surface of said motor vehicle is removed together with said masking material.

14. The method of claim 13, wherein said blocking agent is polyethylene glycol.

15. The method of claim 13, wherein said surfactant composition is present at an amount ranging between about 0.1% to about 1%, by weight, of the total composition.

16. The method of claim 13, wherein said surfactant composition includes a functional derivative of a fluorinated alkyl chain.

17. The method of claim 13, wherein said masking material further comprises about 1% to about 2% of a plasticizer by weight.

18. The method of claim 17, wherein said plasticizer is selected from the group consisting of glycerine, polyethylene glycol, and triethylene glycol.

19. The method of claim 18, wherein said masking material comprises:

between about 5% to about 15%, by weight, polyvinyl alcohol;

between about 0.4% to about 3%, by weight, polyethylene glycol; and about 2%, by weight, glycerine.

20. A composition for the temporary protection of portions of a motor vehicle surface from paint, said composition comprising:

between about 1% to 30% polyvinyl alcohol by weight;

a surfactant composition present in an amount effective to produce a coating that lays out smoothly in a substantially continuous thin film;

at least about 0.1%, by weight, of a plasticizer; and at least about 60% water by weight.

21. The composition of claim 20, wherein said surfactant is present in an amount ranging from about 0.1% to about 0.3%, by weight of the total composition.

22. The composition of claim 20, wherein said plasticizer is selected from the group consisting of glycerine, polyethylene glycol and triethylene glycol.

23. The composition of claim 20, further comprising a blocking agent selected from the group consisting of polyethylene oxide, polypropylene oxide, polyethylene oxide/polypropylene oxide copolymer, polyethylene glycol, and lecithin.

24. The composition of claim 23, wherein said blocking agent is polyethylene glycol.

25. The composition of claim 20, further comprising lecithin.

\* \* \* \* \*

UNITED STATES PATENT AND TRADEMARK OFFICE
CERTIFICATE OF CORRECTION

PATENT NO. : 5,750,190

DATED : May 12, 1998

INVENTOR(S) : Edward W. Woodhall and Nicholas Kondrats

It is certified that error appears in the above-identified patent and that said Letters Patent is hereby corrected as shown below:

ON TITLE PAGE:

first column, under References Cited, 7th U.S. Patent Document (to Oppenheim et al.): change "3,114,656" to --3,114,650--;

second column, on the line following "Primary Examiner—Janyce Bell' insert missing text:

--Attorney, Agent, or Firm—Townsend and Townsend and Crew LLP--.

In column 9, line 58, change "polyoropylene" to --polypropylene--.

Signed and Sealed this

Twenty-ninth Day of September, 1998

Attest:

BRUCE LEHMAN

*Attesting Officer*     *Commissioner of Patents and Trademarks*

REEXAMINATION CERTIFICATE (3983rd)

United States Patent [19]
Woodhall et al.

[11] B1 5,750,190
[45] Certificate Issued Jan. 25, 2000

[54] PROTECTIVE COATING AND METHOD OF USING SUCH COATING

[75] Inventors: Edward W. Woodhall, Los Altos; Nicholas Kondrats, Goleta, both of Calif.

[73] Assignee: Cal West Equipment Co., Inc., Los Altos, Calif.

Reexamination Request:
No. 90/005,059, Jul. 31, 1998

Reexamination Certificate for:
Patent No.: 5,750,190
Issued: May 12, 1998
Appl. No.: 08/432,024
Filed: May 1, 1995

Certificate of Correction issued Sep. 29, 1998.

Related U.S. Application Data

[60] Continuation-in-part of application No. 08/209,796, Mar. 10, 1994, Pat. No. 5,411,760, which is a division of application No. 08/016,872, Feb. 11, 1993, Pat. No. 5,362,786, which is a continuation of application No. 07/972,037, Nov. 5, 1992, Pat. No. 5,302,413, which is a continuation-in-part of application No. 07/788,006, Nov. 5, 1991, Pat. No. 5,186,978, which is a continuation-in-part of application No. 07/614,330, Nov. 16, 1990, abandoned.

[51] Int. Cl.$^7$ ............... B65B 33/00; C08K 5/54
[52] U.S. Cl. ............ 427/156; 427/154; 427/257; 427/261; 427/282; 427/387; 427/385.5
[58] Field of Search ............ 427/154, 156, 427/282, 421, 429

[56] References Cited

U.S. PATENT DOCUMENTS

| | | |
|---|---|---|
| 2,372,982 | 4/1945 | Richards et al. . |
| 3,114,650 | 12/1963 | Oppenheim et al. . |
| 3,997,674 | 12/1976 | Ukai et al. . |
| 4,055,441 | 10/1977 | Taylor et al. . |
| 4,145,855 | 3/1979 | Sheldon . |
| 4,221,601 | 9/1980 | Augustin et al. . |
| 4,222,922 | 9/1980 | Rees . |
| 4,347,266 | 8/1982 | Norman et al. ............ 427/154 |
| 4,387,108 | 6/1983 | Koch et al. . |
| 4,634,395 | 1/1987 | Burchett . |
| 4,748,049 | 5/1988 | Charles et al. . |
| 5,077,175 | 12/1991 | Fryd et al. . |
| 5,143,949 | 9/1992 | Grogan et al. . |
| 5,201,946 | 4/1993 | Marsek . |
| 5,342,872 | 8/1994 | Huber ............ 428/294 |

FOREIGN PATENT DOCUMENTS

| | | |
|---|---|---|
| 454888 | 3/1949 | Canada . |
| 57-29185 | 6/1982 | Japan . |
| 57-98571 | 6/1982 | Japan . |
| 185634 | 10/1963 | Sweden . |
| 707448 | 4/1954 | United Kingdom . |
| 2 191 717 | 12/1987 | United Kingdom . |
| 2191717 | 12/1987 | United Kingdom . |

OTHER PUBLICATIONS

"Hawley's Condensed Chemical Dictionary" 13th Ed., pp. 888–889, 1997.

Hildebrand, A., "Masker–Aide Puts the Magic in Paint Masking," Hammer and Dolly, vol.24, No. 5, p. 18 (May 1989).

Air Products and Chemicals, Inc. Material Safety Data Sheet, 1980, 1981.

Streitweiser, A. et al., "Introduction to Organic Chemistry," MacMillan Publishing Co., pp. 223–224 (1976).

*Primary Examiner*—Fred J. Parker

[57] ABSTRACT

A vehicle masking material and method of use. The masking material in one embodiment includes polyvinyl alcohol, ethyl alcohol, a plasticizer, a surfactant composition including a functional derivative of a fluorinated alkyl chain, and water. The masking material is applied to a surface which is to be protected from paint overspray or other mechanical process, allowed to dry, and paint is applied. After drying of the paint, the masking material is removed by peeling or water washing.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6–10 and 20–25 are cancelled.

Claims 1, 5, 11, 13 and 17 are determined to be patentable as amended.

Claims 2–4, 12, 14–16 and 18–19, dependent on an amended claim, are determined to be patentable.

1. A method of temporarily protecting portions of a motor vehicle surface from paint, said method comprising the steps of:
   a) applying a masking material to [said] *a painted* surface [portions] of said motor vehicle, wherein said applying is effective to produce a substantially continuous *dry film* of a masking material over said surface [portions of said motor vehicle], said masking material [comprising], *before drying, consisting essentially of*:
      (i) between about 5% to about 25%, by weight, polyvinyl alcohol;
      (ii) less than about 20%, by weight, ethyl alcohol, based on 190 proof alcohol;
      (iii) a surfactant composition present in an amount effective to produce a coating that lays out smoothly in a substantially continuous thin film;
      (iv) less than about 4%, by weight, a blocking agent selected from the group consisting of polyethylene oxide, polypropylene oxide, polyethylene oxide/polypropylene oxide copolymer, polyethylene glycol, and lecithin; [and]
      *(v) about 1% plasticizer; and*
      [(v)] *(vi) balance* water; with the proviso that components (ii) and (iii) are present;
   b) painting said surface of said motor vehicle, wherein said *dry film of said* masking material is effective to prevent paint [to cause contact with said surface portions of said motor vehicle to be protected;] *from contacting the surface covered with said masking material*; and
   c) removing said masking material from said surface [portions of said motor vehicle to be protected by peeling or] with a water wash, whereby paint applied to [said protected portions of said surface of said motor vehicle] *the surface covered by said masking material* is removed together with said masking material.

5. [The method of claim 1, wherein said masking material further comprises between about 0.1% to about 2% lecithin.] *A method of temporarily protecting a motor vehicle surface from paint, said method comprising the steps of:*
   *a) applying a masking material to a painted surface of said motor vehicle, wherein said applying is effective to produce a substantially continuous dry film of a masking material over said surface, said masking material, before drying, consisting essentially of:*
      *(i) between about 5% to about 25%, by weight, polyvinyl alcohol;*
      *(ii) less than about 20%, by weight, ethyl alcohol, based on 190 proof alcohol;*
      *(iii) a surfactant composition present in an amount effective to produce a coating that lays out smoothly in a substantially continuous thin film;*
      *(iv) less than about 4%, by weight, a blocking agent selected from the group consisting of polyethylene oxide, polypropylene oxide, polyethylene oxide/polypropylene oxide copolymer, polyethylene glycol, and lecithin;*
      *(v) about 1% plasticizer;*
      *(vi) between about 0.1% to about 2% lecithin; and*
      *(vii) balance water; with the proviso that components (ii) and (iii) are present;*
   *b) paiting a surface of said motor vehicle, wherein said dry film of said masking material is effective to prevent paint from contacting the surface covered with said masking material; and*
   *c) removing said masking material from said surface covered with said masking material with a water wash, whereby paint applied to the surface covered by said masking material is removed together with said masking material.*

11. The method of claim [10]*1*, wherein said plasticizer is selected from the group consisting of glycerine, polyethylene glycol, and triethylene glycol.

13. A method of temporarily protecting portions of a motor vehicle surface from paint, said method comprising the steps of:
    a) applying a masking material to [said] *a painted* surface [portions] of said motor vehicle, wherein said applying is effective to produce a substantially continuous *dry film* of a masking material over said surface [portions of said motor vehicle], said masking material [comprising], *before drying, consisting essentially of:*
       (i) between about 5% to about 25%, by weight, polyvinyl alcohol;
       (ii) a surfactant composition present in an amount effective to produce a coating that lays out smoothly in a substantially continuous thin film;
       (iii) less than about 4%, by weight, a blocking agent selected from the group consisting of polyethylene oxide polypropylene oxide, polyethylene oxide/polypropylene oxide copolymer, polyethylene glycol, and lecithin; [and]
       *(iv) a plasticizer; and*
       [(iv)] *(v) balance* water; with the proviso that component (iii) is present;
    b) painting said surface of said motor vehicle, wherein said *dry coating of said* masking material is effective to prevent paint [to cause contact with said surface portions of said motor vehicle to be protected;] *from contacting the surface covered with said masking material*; and
    c) removing said masking material from said surface [portions of said motor vehicle to be protected by peeling or] with a water wash, whereby paint applied to [said protected portions of said surface of said motor vehicle] *the surface covered by said masking material* is removed together with said masking material.

17. The method of claim 13, wherein said [masking material further comprises] *plasticizer is present at* about 1% to about 2% [of a plasticizer] by weight.

* * * * *